United States Patent
Schorn et al.

(10) Patent No.: US 8,205,726 B2
(45) Date of Patent: Jun. 26, 2012

(54) BRAKE PAD AND CALIPER FOR A DISC BRAKE

(75) Inventors: Michael Schorn, Camparada (IT);
Giovanni Mario Tironi, Dalmine (IT);
Enrico Battista Ongaretti, Stezzano (IT); Paolo Sala, Villa D'Adda (IT)

(73) Assignee: Freni Brembo S.p.A., Bergamo (IT)

( * ) Notice: Subject to any disclaimer, the term of this patent is extended or adjusted under 35 U.S.C. 154(b) by 1028 days.

(21) Appl. No.: 10/583,390

(22) PCT Filed: Dec. 30, 2003

(86) PCT No.: PCT/IT03/00870
§ 371 (c)(1),
(2), (4) Date: Jun. 21, 2007

(87) PCT Pub. No.: WO2005/064188
PCT Pub. Date: Jul. 14, 2005

(65) Prior Publication Data
US 2007/0240946 A1      Oct. 18, 2007

(51) Int. Cl.
*F16D 65/38* (2006.01)
*F16D 55/00* (2006.01)

(52) U.S. Cl. .......... 188/73.37; 188/72.2; 188/72.3; 188/73.1; 188/73.31; 188/73.38; 188/73.45; 188/250 B (58) Field of Classification Search .......... 188/73.37, 188/73.1, 73.46–73.47, 370, 250 E, 71.1, 188/73.34, 73.39, 73.32; F16D 55/00, 55/02, F16D 55/227, 65/092, 65/095, 65/097, 65/00, F16D 55/2265
See application file for complete search history.

(56) References Cited

U.S. PATENT DOCUMENTS

| 3,349,871 | A | * | 10/1967 | Walther et al. | 188/73.39 |
| 3,500,967 | A | * | 3/1970 | Nolan | 188/72.4 |
| 3,616,878 | A | * | 11/1971 | Girauldon | 188/73.38 |
| 3,638,765 | A | * | 2/1972 | Flaherty et al. | 188/73.38 |

(Continued)

FOREIGN PATENT DOCUMENTS

DE     3530598     *    3/1987

(Continued)

OTHER PUBLICATIONS

PCT Search Report—Aug. 24, 2004.

(Continued)

*Primary Examiner* — Robert A Siconolfi
*Assistant Examiner* — San Aung
(74) *Attorney, Agent, or Firm* — Sofer & Haroun, LLP (57) ABSTRACT

A brake pad (5) for a disc brake (1) that can be associated with a caliper (2) with thrust means (9a, 9b, 9c) for clamping the brake pad (5) with friction against a braking band (4) of a brake disc (41), wherein the brake pad (5) comprises:
a plate (6) with a central portion (11) provided with a layer of friction material (7), said central portion (11) having an upper edge (12) and an opposed lower edge (13) and also two lateral edges (6a, 6b) and
two support appendages (14) which extend from said lateral edges (6a, 6b) of the central portion (11), each of said support appendages (14) bounding an eye (16) capable of receiving a pin (27) of the caliper (2).
The upper edge (12) and lower edge (13) extend substantially along circumferences of a circle imparting an arcuate shape to the central portion (11), and said support appendages (14) are disposed substantially at the height of said lower edge (13) of the brake pad (5).

28 Claims, 3 Drawing Sheets

U.S. PATENT DOCUMENTS

| | | | | |
|---|---|---|---|---|
| 3,977,499 A * | 8/1976 | Johannesen | | 188/73.38 |
| 4,181,200 A * | 1/1980 | Souma | | 188/73.38 |
| 4,214,649 A * | 7/1980 | Fujimori et al. | | 188/73.38 |
| 4,245,723 A * | 1/1981 | Moriya | | 188/72.3 |
| 4,365,695 A | 12/1982 | Rath | | 188/73.39 |
| 4,373,615 A * | 2/1983 | Melinat | | 188/73.1 |
| 5,396,972 A | 3/1995 | Grele | | 188/250 |
| 2002/0029942 A1* | 3/2002 | Miyata | | 188/73.31 |

FOREIGN PATENT DOCUMENTS

| | | |
|---|---|---|
| DE | 4416815 | 5/1994 |
| EP | 61082027 | 4/1986 |
| WO | WO9827355 | 6/1998 |

OTHER PUBLICATIONS

International Search Report—Aug. 12, 2004.

* cited by examiner

BRAKE PAD AND CALIPER FOR A DISC BRAKE

RELATED APPLICATIONS

The present application is a national phase application of PCT/IT2003/000870 which was filed on Dec. 30, 2003, the entirety of which is incorporated herein by reference.

BACKGROUND OF THE INVENTION

The present invention relates to a brake pad and a caliper for a disc brake.

Disc brakes are known in which the brake pads are substantially rectangular in shape, wherein the forward edge and the rearward edge of the pad respectively constitute opposing surfaces which, depending on whether braking takes place in forward motion or in reverse motion, abut against corresponding forward or rearward walls of a suitable seat of the caliper body.

Disc brakes are also known in which the brake pads are coupled to the caliper at or near their rearward side, seen in the direction of rotation of the brake disc, and are free to pivot, within certain limits, about the coupling point. During braking in forward motion, the brake pad, held at the coupling point, is principally stressed in tension, while during braking in reverse motion, it abuts against the coupling point and is consequently stressed in compression.

The brake pads and calipers of the prior art, while being advantageous from various points of view, are subject to annoying vibration, juddering and noisiness, and the pads exhibit non-uniform wear of the friction material and therefore a reduced-service life.

It is therefore the aim of the present invention to provide a brake pad and a caliper for a disc brake having characteristics such as to remedy the drawbacks of the known solutions.

SUMMARY OF THE INVENTION

This aim is achieved by means of a brake pad for a disc brake according to claim 1 and by means of a caliper for a disc brake according to claim 12.

BRIEF DESCRIPTION OF THE DRAWINGS

For better understanding of the invention and the advantages thereof, a description will be given below of some non-limiting exemplary embodiments thereof, with reference to the appended drawings, in which.

DESCRIPTION OF THE PREFERRED EMBODIMENTS

With reference to the drawings, a disc brake, in particular for use in motor vehicles, is indicated overall by the reference 1. In the specific case, it is a disc brake of the type with fixed caliper.

The disc brake 1 comprises a caliper 2 and a brake disc 41. The caliper 2 is secured, by means of fixing screws, to a vehicle suspension, while the brake disc 41, equipped with an annular braking band 4, is connectable to the wheel hub of the vehicle.

The caliper 2 comprises two lateral walls 3 disposed on both sides of the disc 41 and connected to each other by means of connecting members 20 which straddle the braking band 4 which, when the vehicle is in forward motion, passes through the caliper 2 in the direction of the arrow F, and in the opposite direction, designated by means of the arrow B, when the vehicle is in reverse motion.

At least two brake pads 5, consisting respectively of a plate 6, for example made of steel, having a coating of friction material 7, are each disposed on one side of the brake disc 41 at the braking band 4, and are received, so that they cannot be lost, in suitable seats 8 of the caliper 2.

The brake pads 5, displaceable in a direction perpendicular to the plane of the brake disc 41, can be acted upon by thrust means, such as, for example, one or more hydraulic cylinder/piston units 9a, 9b, 9c disposed in the caliper 2 so as to clamp, by means of the friction coating 7, a sector of the braking band 4, the surface and shape of which correspond to those of the friction coatings 7.

In order to prevent the brake pads 5 from knocking in the seats 8 while the vehicle is in motion without the brake actuated, suitable spring elements 10 for brake pads are provided which exert a resilient bias on the pads 5 to arrest them in the seats 8.

The plate 6 of each brake pad 5 is substantially flat and has a central portion 11 in the shape of a rectangle distorted in the plane in the shape of an arc. This central portion 11 has an upper edge 12 and a lower edge 13 opposed to the upper edge 12. Preferably, the upper edge 12 and lower edge 13 extend along circumferences of a circle which determine the arcuate form of the central portion 11. In other words, the upper edge 12 is substantially convex and the lower edge 13 is substantially concave.

The plate 6 or its central portion 11 further comprises two lateral edges, in particular a forward edge 6b and a rearward edge 6a opposed to the forward edge 6b, with reference to the direction of rotation F of the disc 41 corresponding to forward motion of the vehicle. In other words, in forward motion, the braking band 4, passing through the caliper 2, encounters first the rearward lateral edge 6a and then the forward lateral edge 6b of the plate 6.

Preferably, said lateral edges 6b and 6a are substantially rectilinear and parallel and, advantageously, perpendicular to a direction Ts tangential to the upper edge 12 and/or to a tangentional direction Ti of the lower edge 13 at a point halfway between the lateral edges 6a, 6b.

From the lateral edges 6a, 6b of the plate 6, near or at the lower edge 13 (that is to say the concave edge of the central portion 11), support appendages 14 protrude which extend substantially transversely, preferably perpendicularly, to the lateral edges 6a and 6b. In other words, the support appendages 14 extend parallel to the tangential direction Ts and Ti.

Advantageously, the arcuate central portion 11 forms together with the support appendages 14 an "Ω"-shaped structure.

The support appendages 14 lie in the same plane as the plate 6 and are made in one piece with the latter. Advantageously, they have a substantially rectangular shape with the corners rounded and each of the appendages 14 comprises an upper surface 15 facing radially outwards with respect to an axis of rotation r of the brake disc (see FIG. 4). In other words, the upper surfaces 15 face in the same direction as the upper edge 12.

According to one embodiment, the upper surfaces 15 are substantially flat and extend in a direction parallel to the directions Ts, Ti tangential to the upper edge 12 and lower edge 13.

Each appendage 14 bounds an eye 16 disposed outside the coating of friction material 7 and the central portion 11 of the plate 6.

According to one embodiment, the eye 16 has a substantially rectangular shape with the corners rounded or chamfered. Advantageously, the eyes 16 are disposed on the tangent Ti to the lower edge 13 at the point halfway between the lateral edges 6a and 6b.

From each of the lateral edges 6a, 6b of the plate 6 there extends, at the upper edge 12, a protuberance 17 which forms a prolongation of the upper edge 12 outside the central portion 11.

The protuberance 17 comprises a bearing surface 18 facing radially outwards with respect to the axis of rotation r of the brake disc or, in other words, oriented in the same way as the upper edge 12.

Each of the two eyes 16 is intended to receive, with play, a respective pin 27 of the caliper 2, the spacing and size of the eyes 16 and of the pins 27 being selected such that the pins 27 can bear only against the walls of the eyes 16 opposed to the central portion 11 of the brake pad 5. In this way, during braking, the pad 5 is in tension and transmits the braking force always to the pin disposed on the inlet side of the brake disc 41 in the space between the pads, while the pin disposed on the outlet side of the disc effects only radial bearing with respect to the axis of rotation r of the brake disc.

The upper surfaces 15 of the support appendages 14 and the bearing surfaces 18 of the protuberances 17 constitute locating means or seats against which one or more spring elements 10 for brake pads can abut, in order to maintain the pads 5 resiliently in position.

Advantageously, the upper surfaces 15 of the appendages 14 are flat and parallel to the tangent Ts to the upper edge 12 at the point halfway between the lateral edges 6a and 6b, allowing the brake pad spring element 10 bearing against them to push the pad 5 resiliently downwards or radially towards the axis of rotation r of the brake disc 41.

The bearing surfaces 18 of the protuberances 17 are inclined with respect to the tangents Ts and Ti, so as to allow the brake pad spring elements abutting on them to exert a resilient thrust towards the central portion 11 of the pad to stabilise the latter in a circumferential direction with respect to the axis of rotation r of the brake disc 41.

Advantageously, the brake pad 5, in particular its appendages 14, are symmetrical with respect to a line substantially radial to the axis of rotation r of the brake disc 41.

The seats 8 provided in the lateral walls 3 of the caliper 1 have a shape suitable for receiving the pads 5 by means of the interposition of the brake pad spring elements 10.

Figures 1, 2:
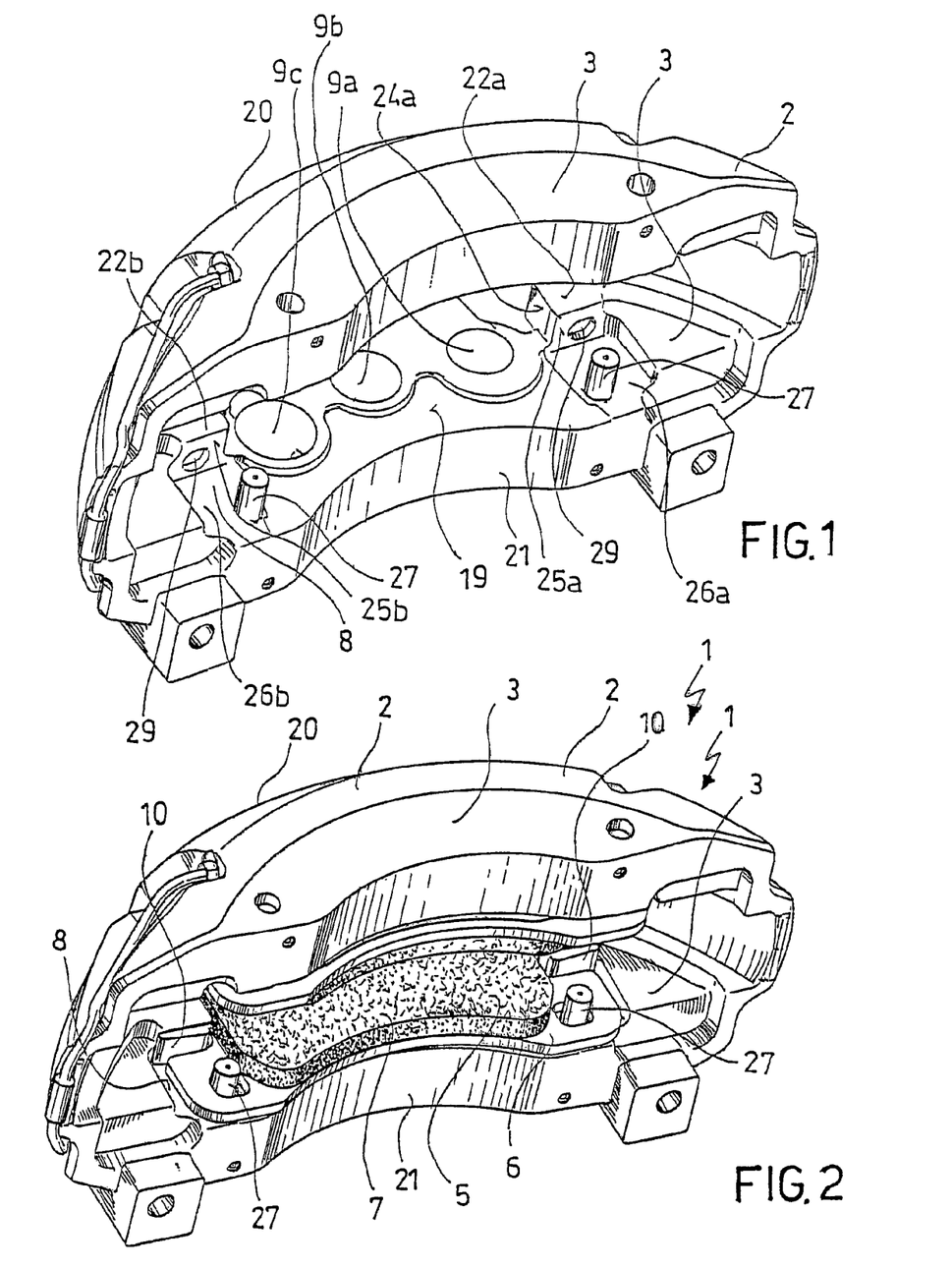
FIG. 1 is a perspective view of a caliper for a disc brake according to the invention.
FIG. 2 is a perspective view of the caliper of FIG. 1, equipped with two brake pads according to the invention.
Figures 3, 4, 5, 6:
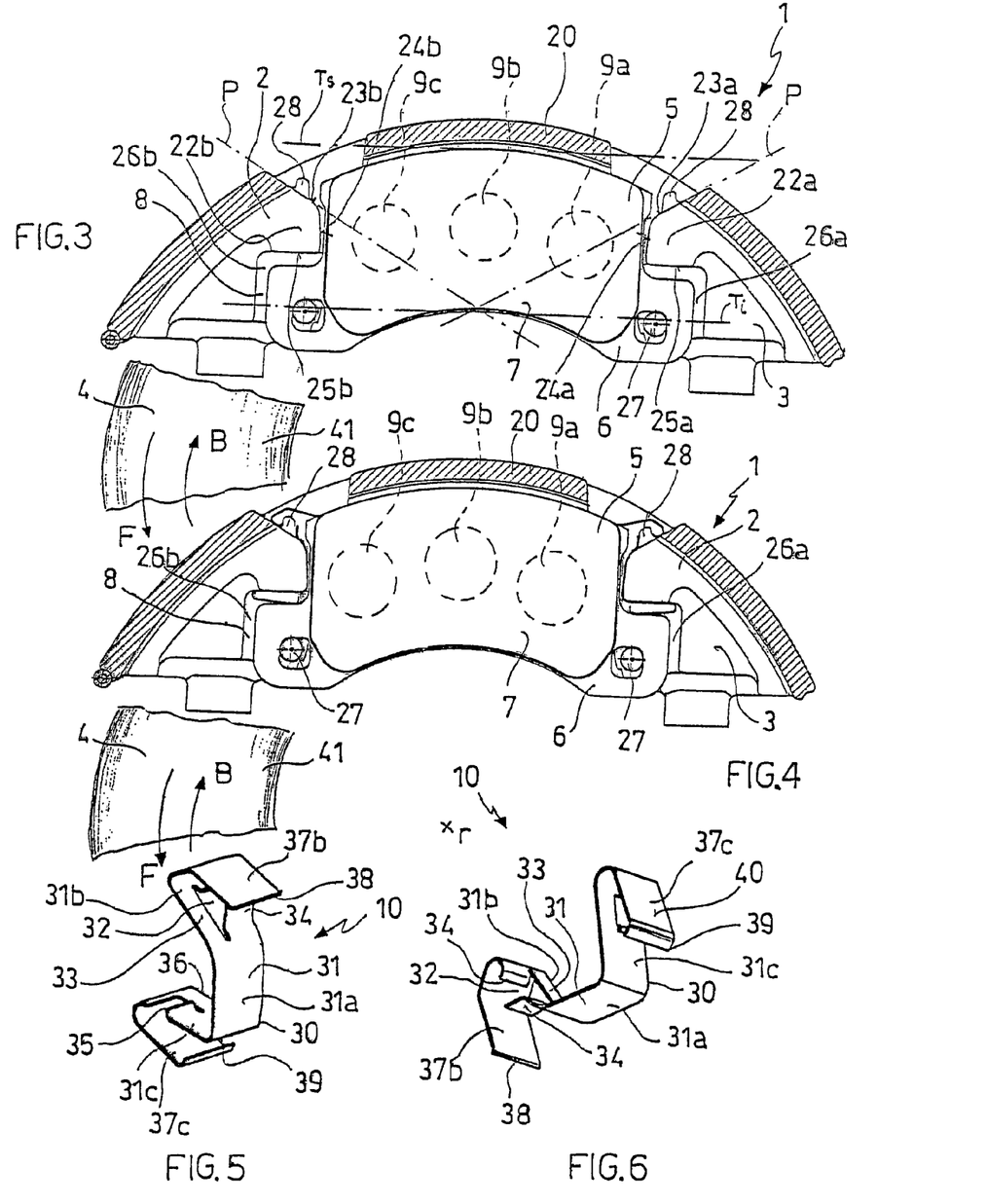
FIG. 3 is a view in longitudinal section of the caliper of FIG. 2, in which view some details have been omitted.
FIG. 4 is a view in longitudinal section of the caliper of FIG. 2.
FIGS. 5 and 6 are two perspective views of a spring element for brake pads.
Figure 7:
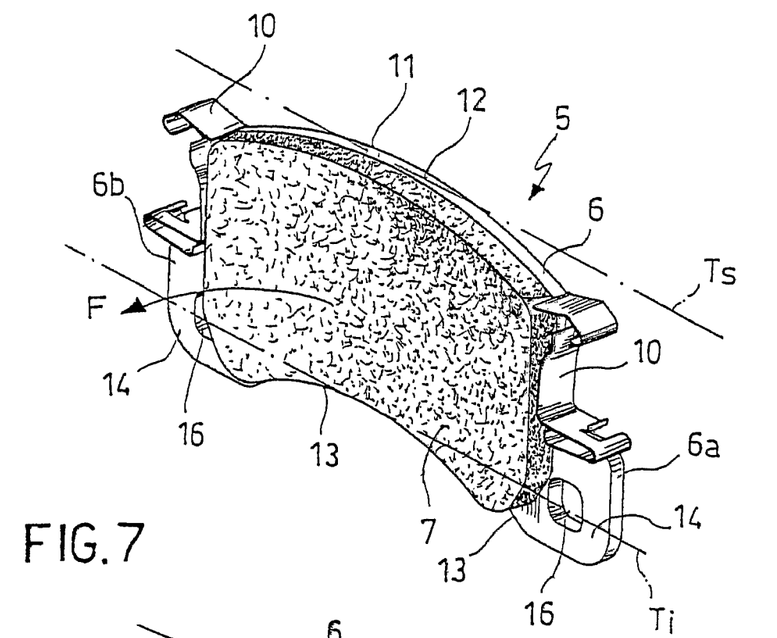
FIG. 7 is a perspective view of the brake pad of the caliper in FIG. 4, equipped with two spring elements for brake pads.
Figure 8:
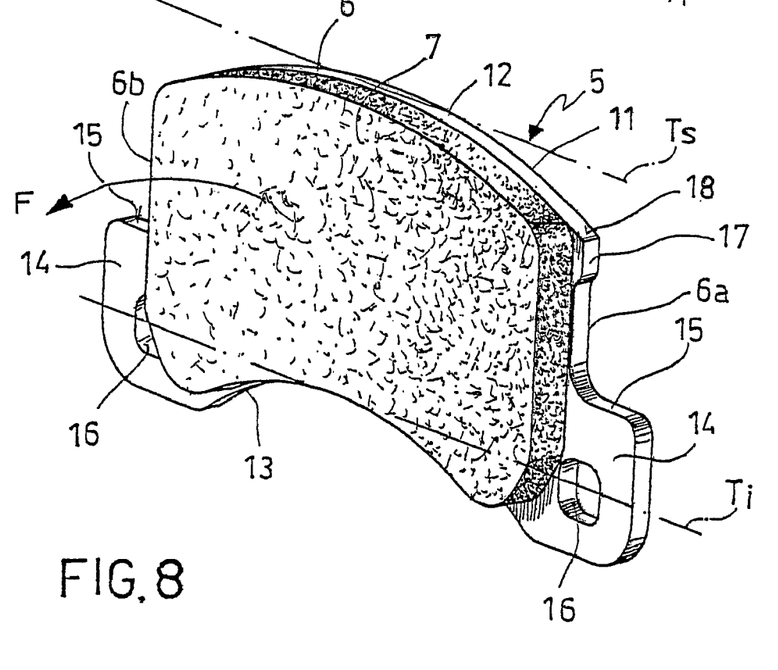
FIG. 8 is a perspective view of the brake pad of the caliper of FIG. 3.

According to the embodiment shown in FIGS. 1, 3 and 4, the seats 8 are substantially flat and have a central space 19 in the shape of a rectangle distorted in the plane in the shape of an arc. This central space 19 is bounded at the top by a connecting member 20 which connects the two lateral walls 3 of the caliper 2, and at the bottom by a lower edge 21 of the lateral wall 3 opposed to the aforesaid connecting member 20. Preferably, at the aforesaid lower edge 21 of the lateral wall 3, the seat 8 is open towards the outside of the caliper 2 and devoid of any opposing or bearing surface which might prevent displacement of the pad 5.

Advantageously, both the connecting member 20 and the lower edge 21 extend along circumferences of a circle, determining the arcuate shape of the central space 19. Or, in other words, the connecting member 20 is substantially convex and the lower edge 21 is substantially concave, seen from outside the central space 19.

The central space 19 is laterally bounded by a forward containment wall 22b and by a rearward containment wall 22a opposed to the forward wall, still with reference to the direction of forward motion F of the disc 41. In other words, in forward motion, the braking band 4, passing through the caliper 2, encounters first the rearward containment wall 22a and then the forward containment wall 22b of the seat 8.

Preferably, each of said containment walls 22a, 22b has an upper surface 23a facing radially outwards with respect to the axis of rotation r of the brake disc 41, to which is connected a lateral surface 24a, 24b facing towards the central space 19 and a lower surface 25a, 25b facing radially inwards with respect to the axis of rotation r.

Preferably, the upper surfaces 23a, 23b of the containment walls 22a, 22b are substantially flat and oriented or inclined towards the central space 19. Advantageously, said upper surfaces 23a, 23b lie in planes P which intersect the lower edge 21 at a point halfway between the two containment walls 22a and 22b (see FIG. 3).

The lateral surfaces 24a and 24b are connected, by means of a rounded transition section, to the upper surfaces 23a, 23b.

According to the embodiment shown in FIGS. 3 and 4, the lateral surfaces 24a, 24b are substantially flat and facing one another.

The lateral surfaces 24a, 24b may be parallel or, as revealed by the figures, inclined in such a way that the central space 19 bounded by them widens out towards the connecting member 20, that is to say, in a radial direction with respect to the axis of rotation r of the disc 41.

To the lateral surface 24a, 24b of each containment wall 22a, 22b is connected the respective lower surface 25a, 25b which faces radially towards the axis of rotation r of the brake disc. In other words, the lower surfaces 25a, 25b are disposed on the side of the containment walls 22a, 22b opposed to the upper surfaces 23a, 23b and face in the same direction as the lower edge 21 of the lateral wall 3.

According to one embodiment, the lower surfaces 25a, 25b are substantially flat and extend in a direction parallel to the directions tangential to the connecting member 20 and to the lower edge 21 at a point halfway between the containment walls 22a, 22b.

From the central space 19 of the seat 8, at the lower edge 21, two outer spaces 26a, 26b extend which are bounded at the top by the aforesaid lower surfaces 25a, 25b of the containment walls 22a, 22b.

Advantageously, the arcuate central space 19 forms together with the outer spaces 26a, 26b an "Ω"-shaped seat.

The outer spaces 26a, 26b are provided in the lateral walls 3 in the same plane as the central spaces 19, and advantageously have a substantially rectangular shape with the corners rounded.

Within each outer space 26a, 26b is respectively disposed one of the pins 27 intended to be inserted into the eyes 16 of the brake pad 5.

The pins 27 may be made in one piece with the caliper or, preferably, are obtained separately from a suitable material and then secured to the lateral walls 3 of the caliper 2.

Advantageously, the chamfering radius of the eyes 16 is less than the radius of the cylindrical pins 27 so that the mutual bearing between the pin and (the chamfered angle of) the eye occurs at two points of contact. According to one embodiment, the material of the plate 6 of the brake pad 5 is suitable for undergoing plastic deformation within certain limits, such as to adapt the shape of the eye 16 in the region of contact with the pin 27 exactly to the shape of the latter.

Advantageously, the longitudinal axes of the two pins 27 of each seat 8 lie approximately in the plane tangent to the lower edge 21 of the respective lateral wall 3 of the caliper 2 at a point halfway between the two containment walls 22a, 22b of the seat 8.

The containment walls 22a, 22b, besides delimiting the seats 8 for the brake pads 5, also constitute seats for the brake pad spring elements 10, which have a shape such as to be able to tighten resiliently about their upper surfaces 23a, 23b, lateral surfaces 24a, 24b and lower surfaces 25a, 25b.

From each of the two upper surfaces 23a, 23b of the containment walls 22a, 22b a stop tooth 28 protrudes, capable of engaging a suitable seat of the brake pad spring element 10 to prevent the latter from becoming detached from the containment wall 22a, 22b.

Advantageously, the stop tooth 28 is spaced from the surface of the lateral wall 3 or of the seat 8 so as to delimit between the latter and the stop tooth 28 a passage for the spring element 10.

According to one embodiment, each of the lower surfaces 25a, 25b of the containment walls 22a, 22b has a recess 29, preferably oval and capable of receiving a suitable protuberance or projection of the brake pad spring element 10 to provide a second point at which the spring element 10 is secured to the containment wall 22a, 22b. The brake pad spring element 10 comprises a strip or an elongate plate 30 of resilient material, for example, spring steel, which plate 30 is bent so as to form a "C"-shaped base 31, preferably rectangular or trapezoidal or, alternatively, arcuate.

According to the embodiment shown in FIGS. 5 and 6, the base 31 of the brake pad spring element 10 is in the shape of a trapezium bounded along the sides and along the minor base and open along the major base.

The base 31 is preferably shaped so as to be substantially complementary to the shape of the containment wall 22a, 22b of the caliper 2 and capable of tightening resiliently about the latter.

The base 31 formed by a central section 31a which forms the minor base of the trapezium, an upper section 31b and a lower section 31c which respectively form the sides of the trapezium has, in the upper section 31b, a recess 32 capable of receiving the tooth 28 formed on the containment wall 22a, 22b of the caliper 2.

This recess 32 may be obtained by means of local deformation or removal of material of the plate 30 of the spring element 10, for example by means of punching or shearing.

According to one embodiment, in the region of the recess 32, the plate 30 of the spring element 10 has a notch or an aperture transverse to the length of the plate 30. This notch or aperture involves only a part of the width of the plate 30 so that a bridge 33 remains which ensures the structural continuity of the spring element 10 in this region. At the two opposed sides of the recess 32 (seen in the longitudinal direction of the plate 30) are formed two limbs 34 bent back in such a way as to form opposing walls capable of bearing from two opposed sides against the tooth 28 of the caliper 2, while the bridge 33 is intended to be placed in the space between the tooth 28 and the lateral wall 3 of the caliper 2.

In the lower section 31c of the base 31a projection or protuberance 35 is formed, capable of engaging the recess 29 of the containment wall 22a, 22b of the caliper 2.

This protuberance 35 may be obtained by means of local deformation of the plate 30 of the spring element 10, for example by means of punching or shearing and bending. According to one embodiment, in the region of the protuberance 35, the plate 30 of the spring element 10 has a notch transverse to the length of the plate 30. The notch or aperture involves only a part of the width of the plate 30 so that a bridge 36 remains which ensures the structural continuity of the spring element 10 in that region. On at least one side of the notch there is formed at least one limb bent back towards the inside of the base 31 so as to form precisely said projection 35. From the upper section 31b and lower section 31c of the base 31 of the spring element 10 extend respective pressure sections, upper 37b and lower 37c, suitable for resiliently biasing the brake pad 5 so as to hold it in position in the seat 8 and prevent any unwanted vibration and displacement.

The pressure sections, upper 37b and lower 37c, are bent back with respect to the adjacent upper side 31b and lower side 31c of the base 31 and extend in a direction substantially opposed to these latter. In other words, the pressure sections, upper 37b and lower 37c, are oriented towards the side of the spring element 10 on which is disposed the central section 31a of the base 31, that is to say, its closed side.

The brake pad spring element 10 therefore has an overall shape similar to the letter "ζ" (lower case Greek letter zeta) or to its mirror image.

According to a further embodiment, the brake pad spring element 10 has an overall shape similar to the letter "Σ" (upper case Greek letter Sigma) or to its mirror image.

Each of the pressure sections 37b, 37c forms together with the adjacent section 31b, 31c of the base 31 a resilient arc the elastic deformation of which, with the spring element 10 mounted, forms the resilient bias acting on the brake pad 5.

An edge 38 of the free end of the upper pressure section 37b, preferably bent in a direction opposed to the base 31, constitutes a bearing surface for the bearing of the upper pressure section 37b on the bearing surface 18 of the protuberances 17 of the brake pad 5.

An edge 39 of the free end of the lower pressure section 37c, preferably bent towards the base 31, constitutes a spacing device capable of preventing said lower pressure section 37c from coming too close to the lower section 31c of the base 31, while an outer surface 40 of the lower pressure section 37c, facing away from the base 31, constitutes a bearing surface for the resilient bearing of the lower pressure section 37c on the upper surface 15 of the appendages 14 of the brake pad 5.

As revealed by the figures, the two brake pad spring elements 10 associated with each seat 8 have a structure and shape which is chiral or, in other words, mirror-image but not superposable.

A description will now be given of the mounting of the brake pads in the caliper, and of the operation of a disc brake equipped with a brake pad and a caliper according to the invention.

The brake pad spring elements 10 are slipped from inside the seat 8 for the brake pad, on the containment walls 22a, 22b. During the insertion of the spring element 10, the upper section 31b of the base 31 slides on the upper surface 23a, 23b with the tooth 28 of the containment wall 22a, 22b as far as the point where the tooth 28 engages the recess 32 of the spring element 10. The lower section 31c of the base 31 of the spring element, on the other hand, slides on the lower surface 25a of the containment wall 22a, 22b as far as the point where the protuberance 35 of the spring element 10 snaps into the recess 29 of the containment wall.

The bases 31 of the spring elements resiliently surround the containment walls 22a, 22b and the engagement between the protuberance 35 and the recess 29, and also between the recess 32 and the tooth 28, ensures stable and secure fixing of the spring elements.

After the mounting of the spring elements 10, the brake pads 5 are mounted. These are positioned such that the two eyes 16 are aligned with the pins 27 of the caliper and such that the upper surfaces 15 of the appendages 14 and the upper surfaces 18 of the protuberances 17 of the brake pad 5 rest from below against the edges 38 and the outer surfaces 40 of the spring elements 10. Positioned thus, the brake pad is displaced upwards, resiliently deforming the spring elements 10, and pushed axially on the pins 27 of the caliper 2.

Owing to the reaction force of the deformed spring element, the edge 38 of the upper pressure section 37b stresses the upper surface 18 of the protuberance 17 of the brake pad 5, thus resiliently opposing the movements of the brake pad in a circumferential direction with respect to the axis of rotation r of the brake disc. The outer surface 40 of the lower pressure section 37c resiliently stresses the upper surface 15 of the appendage 14 of the brake pad, pushing it downwards or radially towards the axis of rotation r so that the pins 27 come into bearing contact against the upper walls of the eyes 16 of the brake pad.

In this way the brake pad is held in the seat of the caliper in a secure manner, free of vibration.

While the vehicle is in motion without the brakes actuated, the brake pads 5, housed in the seats 8 of the caliper 2, are maintained, via the spring elements 10, at a certain distance from each other and from the braking band 4.

Since the dimension of the eyes 16 is greater than the diameter of the pins 27 and the spring elements 10 maintain the upper walls of the eyes 16 in contact with the pins 27, the brake pads 5 are displaceable, within certain limits, in a direction tangential to the axis of rotation r of the brake disc. This tangential movement is, however, resiliently opposed by the upper pressure sections 37b of the spring elements 10.

The brake pad 5 is therefore connected to the seat 8 of the caliper 2 only by means of the contact between the two pins 27 and the eyes 16 and maintained in position by the spring elements 10.

As a consequence, while the vehicle is in motion without the brakes actuated and during light braking, the brake pad is unusually quiet and not subject to vibration and juddering.

During a braking operation, the brake pads 5 are pushed against the braking band 4 in rotation and grip the latter by friction. The braking band 4 in its turn entrains the brake pads 5 in the direction circumferential to the axis of rotation r in such a way that the eye 16 disposed on the rearward side of the brake pad (in other words: on the inlet side of the disc in the space between the brake pads) abuts on the respective pin 27, arresting the brake pad 5 which is pulled completely.

Since the spring elements push the brake pad downwards and the eyes are disposed in a lower portion of the brake pad, the upper walls of the eyes always abut on the pins, and the pin which transmits the braking force assumes a position precisely in the angle between the upper wall and the outer wall of the eye opposed to the central portion of the brake pad.

Owing to the difference between the chamfering radius of the eye and the radius of the pin, two lines of contact are formed between the pin and the eye, which may become, owing to plastic deformation of the eye, a contact surface having substantially the shape of the outer surface of the pin.

During a braking operation, the brake pad thus supported within the caliper is free of vibration and the friction coating 7 is subjected to very uniform wear.

An expert in the field, for the purpose of satisfying contingent and specific requirements, may of course apply further modifications and variants to the brake pad and to the caliper for a disc brake according to the present invention, all, however, contained within the scope of protection of the invention as defined by the following claims.

What is claimed is:

1. A brake pad for a disc brake that can be associated with a caliper with thrust means for clamping said brake pad with friction against a braking band of a brake disc, wherein the brake pad comprises:

a plate with a central portion provided with a layer of friction material, said central portion having an upper edge and an opposed arcuate lower edge and also two lateral edges, said lower arcuate edge having a tangent point;

two support appendages which extend from said lateral edges of the central portion, each of said support appendages bounding an eye capable of receiving a pin of the caliper, said eyes disposed substantially on a tangent line to the lower arcuate edge at the tangent point halfway between said lateral edges such that the tangent line intersects both pins wherein said upper edge and lower edge extend substantially along circumferences of a circle imparting an arcuate shape to the central portion so that said upper edge is substantially convex and said lower edge is substantially concave, and said support appendages are disposed substantially at the height of said lower edge of said brake pad.

2. A brake pad according to claim 1, wherein said central portion forms together with the support appendages an Omega "Ω"-shaped structure.

3. A brake pad according to claim 1, wherein the lateral edges are substantially rectilinear, parallel and perpendicular to a direction tangential to said upper edge at a point halfway between said lateral edges.

4. A brake pad according to claim 3, wherein the support appendages extend substantially perpendicularly to the lateral edges.

5. A brake pad according to claim 1, wherein each of the support appendages comprises an upper surface facing in the same direction as the upper edge and capable of constituting a bearing surface for a brake pad spring element.

6. A brake pad according to claim 5, wherein said upper surfaces are substantially flat and parallel to the direction tangential to the upper edge at a point halfway between the lateral edges.

7. A brake pad according to claim 1, wherein said eyes have a substantially rectangular shape with the corners rounded or chamfered.

8. A brake pad according to claim 1, wherein from each of the lateral edges there extends near the upper edge protuberance which forms a prolongation of the upper edge outside the central portion, said protuberances comprising a bearing surface which constitutes an opposing surface for a brake pad spring element.

9. A brake pad according to claim 8, wherein said bearing surfaces are inclined with respect to the tangents and to the upper edge and lower edge of the central portion, so as to allow the brake pad spring elements abutting on them to exert a resilient thrust towards the central portion.

10. A brake pad according to claim 1, having a symmetrical shape.

11. A disc brake comprising a caliper comprising thrust means for clamping a least two brake pads with friction against a braking band of a brake disc, wherein said caliper comprises:
   at least two seats for receiving said brake pads, each of said seats comprising:
   a central space bounded by a connecting member which connects the two lateral walls of the caliper and a lower edge of the lateral wall opposed to the aforesaid connecting member, and also, laterally, by two containment walls;
   two outer spaces which extend laterally from the central space, there being arranged in each of said outer spaces a pin capable of engaging a respective eye of said brake pad, wherein both the connecting member and the lower edge extend along circumferences of a circle, imparting an arcuate shape to the central space so that said connecting member is substantially convex and said lower edge of said lateral wall is substantially concave, and said outer spaces are disposed substantially at the height of said lower edge of the caliper,
   and said disk brake further comprising:
   a brake pad that can be associated with said caliper, wherein the brake pad comprises:
   a plate with a central portion provided with a layer of friction material, said central portion having an upper edge and an opposed arcuate lower edge and also two lateral edges, said lower arcuate edge having a tangent point;
   two support appendages which extend from said lateral edges of the central portion, each of said support appendages bounding an eye capable of receiving a pin of the caliper, said eyes disposed substantially on a tangent line to the lower arcuate edge at the tangent point halfway between said lateral edges such that the tangent line intersects both pins wherein said upper edge and lower edge extend substantially along circumferences of a circle imparting an arcuate shape to the central portion so that said upper edge of said plate of said brake pad is substantially convex and said lower edge said plate of said brake pad is substantially concave, and said support appendages are disposed substantially at the height of said lower edge of said brake pad.

12. A disc brake according to claim 11, wherein the chamfering radius of the eyes is less than the radius of the cylindrical pins so that the mutual bearing between the pin and the chamfered corner of the eye occurs at two points of contact.

13. A disc brake according to claim 12, equipped with one or more brake pad spring elements, wherein each of said spring elements comprises an elongate plate of resilient material, which plate is bent so as to form a "C"-shaped base, preferably rectangular or trapezoidal, or alternatively arcuate, said base being capable of tightening resiliently about said containment wall of the caliper.

14. A disc brake according to claim 13, wherein the base of the brake pad spring element is in the shape of a trapezium open along the major base and shaped so as to be substantially complementary to the shape of the containment wall.

15. A disc brake according to claim 13, wherein an upper section of said base has a recess capable of receiving a tooth formed on the containment wall of the caliper.

16. A disc brake according to claim 15, wherein said recess is formed by a notch transverse to the length of the plate which involves only a part of the width of the plate so that a bridge remains which ensures the structural continuity of the spring element in the region of the recess.

17. A disc brake according to claim 16, wherein at the two opposed sides of the recess two limbs are formed which are bent back so as to constitute opposing walls capable of bearing from two opposed sides against said tooth of the caliper, while the bridge can be positioned in a space between the tooth and the lateral wall of the caliper.

18. A disc brake according to claim 13, wherein a lower section of said base has a protuberance capable of engaging a recess provided in the containment wall of the caliper.

19. A disc brake according to claim 18, wherein the protuberance of the spring element has been obtained by means of local deformation of the plate, for example by means of punching or shearing and bending.

20. A disc brake according to claim 18, wherein the protuberance is formed by a limb of the spring element bent back towards the inside of the base.

21. A disc brake according to claim 13, wherein from the upper side and lower side of the base of the spring element 3 there extend respective pressure sections, upper and lower, capable of biasing the brake pad resiliently so as to hold it in its position in the seat.

22. A disc brake according to claim 21, wherein the upper pressure section and lower pressure section are bent back with respect to the adjacent upper side and lower side of the base and extend in a direction substantially opposed to these latter.

23. A disc brake according to claim 22, wherein the upper pressure section and lower pressure section are oriented towards the closed side of the base.

24. A disc brake according to claim 13, wherein each pressure section of the spring element forms together with the adjacent lateral section of the base a resilient arc, the elastic deformation of which is capable of forming, with the spring element mounted, a resilient bias acting on the brake pad.

25. A disc brake according to claim 13, wherein the brake pad spring element has an overall shape similar to the letter "□" (lower case Greek letter zeta) or to its mirror image.

26. A disc brake according to claim 13, wherein the brake pad spring element has an overall shape similar to the letter "Σ" (upper case Greek letter Sigma) or to its mirror image.

27. A disc brake according to claim 13, wherein each seat of the caliper has associated with it two brake pad spring elements which have a structure and shape which is chiral, that is to say, mirror-image but not superimposable.

28. A brake pad for a disc brake that can be associated with a caliper with thrust means for clamping said brake pad with friction against a braking band of a brake disc, wherein the brake pad comprises:
   a plate with a central portion provided with a layer of friction material, said central portion having an upper edge and an opposed lower edge and also two lateral edges;

two support appendages which extend from said lateral edges of the central portion, each of said support appendages bounding an eye capable of receiving a pin of the caliper, the radius of said eye being less than the radius of said pin so that the mutual bearing between said pin and said eye occurs at two points of contact, wherein said upper edge and lower edge extend substantially along circumferences of a circle imparting an arcuate shape to the central portion so that said upper edge is substantially convex and said lower edge is substantially concave, and said support appendages are disposed substantially at the height of said lower edge of said brake pad and wherein the material of said plate of said brake pad is suitable for undergoing plastic deformation within certain limits, such as to adapt the shape of said eye in the region of contact with said pin of the caliper to the shape of said pin.

* * * * *